Jan. 10, 1956  A. G. LAZZERY  2,730,285
CAN FILLING MACHINE
Filed Dec. 17, 1951  3 Sheets-Sheet 1
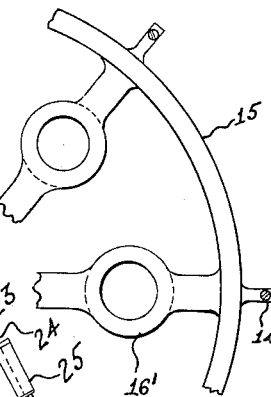
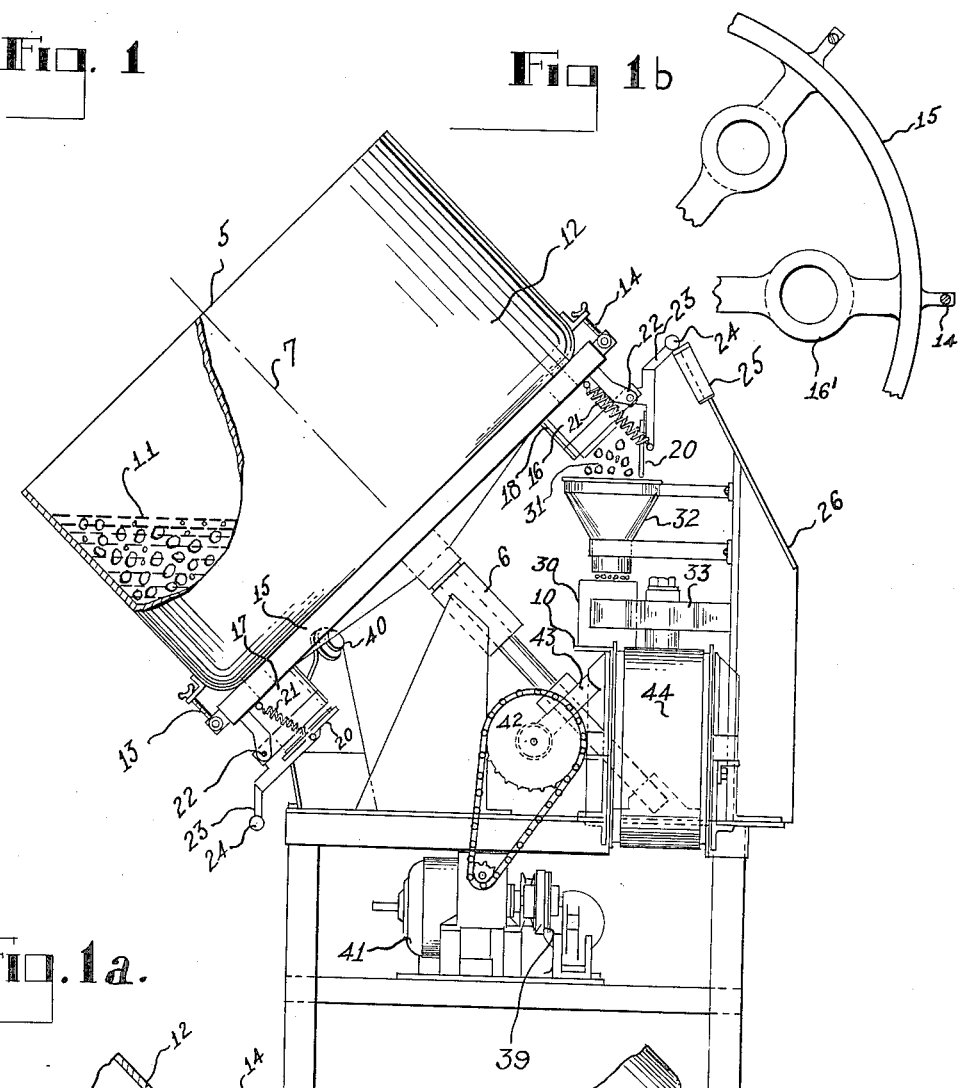
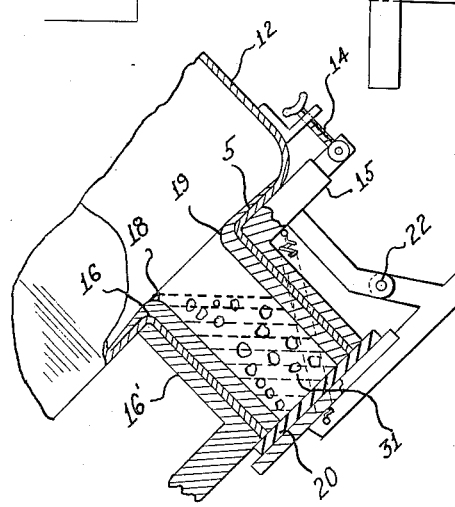
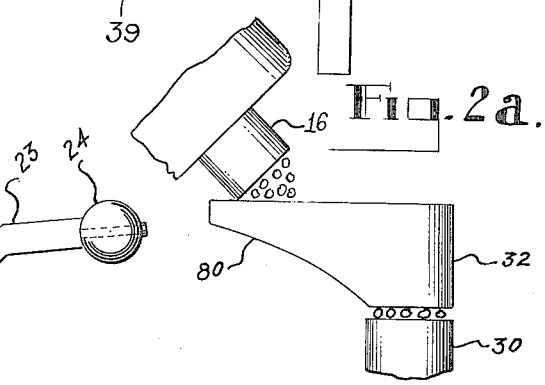
INVENTOR
ANGELO G LAZZERY
BY
Lawrence R. Brown
ATTORNEY

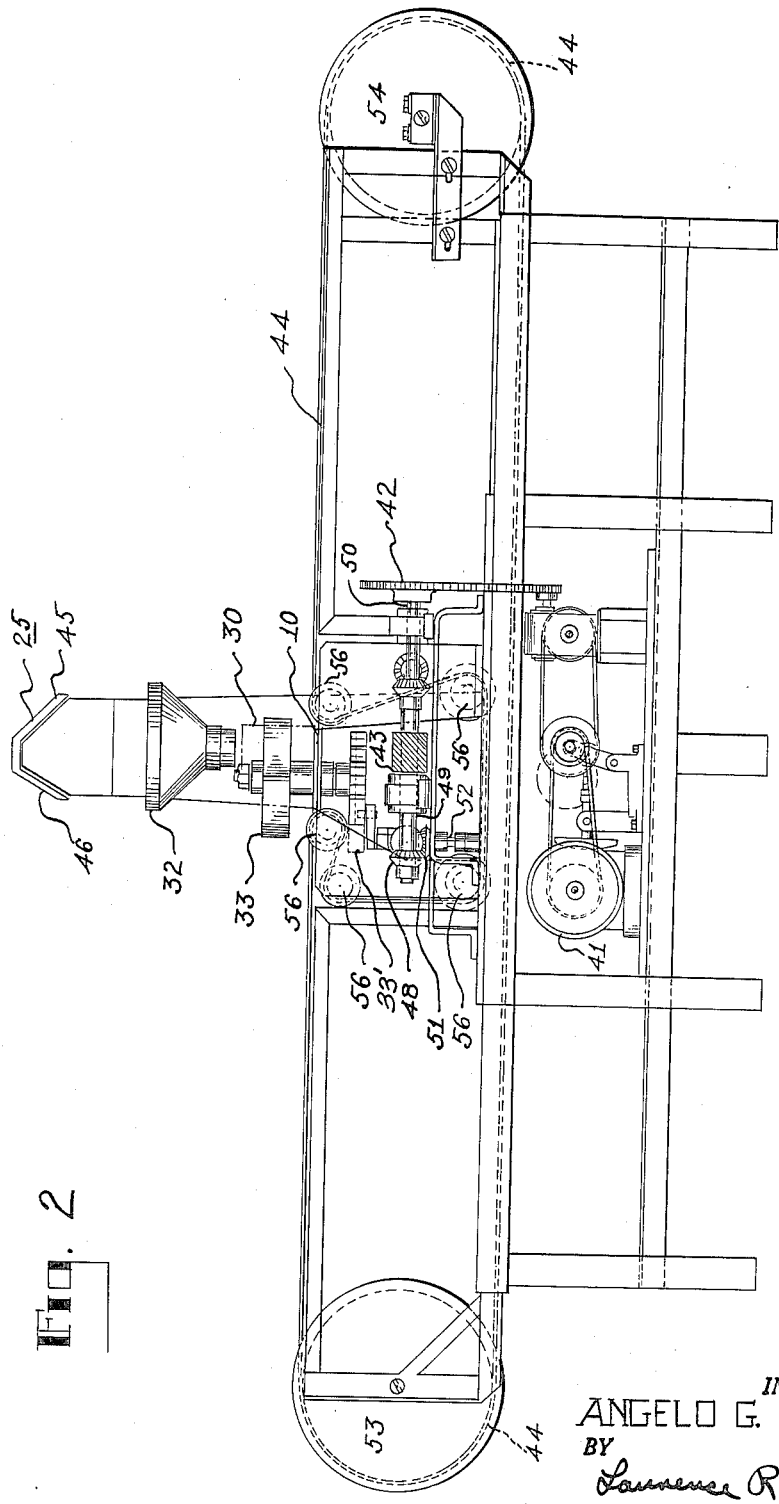

Jan. 10, 1956

A. G. LAZZERY 2,730,285

CAN FILLING MACHINE

Filed Dec. 17, 1951

INVENTOR
ANGELO G LAZZERY
BY
Lawrence R. Brown
ATTORNEY

United States Patent Office 2,730,285
Patented Jan. 10, 1956

2,730,285

CAN FILLING MACHINE

Angelo Gino Lazzery, Oaklyn, N. J., assignor to National Metalcrafters, Inc.

Application December 17, 1951, Serial No. 262,086

2 Claims. (Cl. 226—99)

This invention relates to can filling machines. In particular, the invention relates to can filling machinery which operates to discharge measured quantities of fragile materials immersed in a liquid or brine into cans at high speeds without crushing or damaging the materials.

In filling cans with fragile goods, such as oysters, olives, cherries, etc., which are immersed in a liquid or brine, it has been difficult to provide means accurately measuring the quantities desired for different sizes of cans to be filled at high speeds without crushing the delicate oysters, etc. In addition, canning machinery of the prior art has been inadequate to discharge measured quantities of such materials in the canning process without breakage. Breakage in many cases, as in the packing of oysters, is not permissible by law, and therefore has limited such packing to hand operation in most instances. It is therefore an object of the present invention to provide improved high speed canning machinery for fragile products, such as oysters.

Another object of the invention is to provide can filling machinery which accurately and speedily measures the quantity of delicate materials which are to be discharged into cans without damage to the materials.

A further object of the invention is to provide can filling machinery in which moving parts are isolated from the charge material and therefore cannot crush or mutilate delicate charge materials, such as oysters.

In accordance with the invention, therefore, there is provided can filling machinery having a rotatively mounted cylindrical brine tank. Open ended measuring projections may be selectively fastened to peripheral portions at the bottom of the tank to receive fixed charges of the materials to be canned, which shall hereinafter be referred to more specifically as oysters in the interest of clarity. By mounting the tank rotatively about its axis at an angle of substantially forty-five degrees with respect to a filling platform, or any other angle determined to keep the level of liquid above the level of the measuring projections, and by partially filling the tank so that the level of oysters and brine in the tank do not rise to a level beyond the lower edge of the open mouth of the container projections at the uppermost portion of the tank, an accurate measurement of the charge may be maintained in high speed canning machinery without moving parts in contact with the oysters.

Such a rotating tank, when provided with discharging means constructed in accordance with the present invention, will discharge the charge of materials into a can located under a measuring container at the upper edge of the rotating tank without any damage to the oysters by moving parts in the discharging means.

To prevent mutilating of the materials by the discharging mechanism, spring bias closing means comprising a flat rubber or plastic sealing plate is attached to the bottom of each container and held thereat except during the actual discharging time. A camming arm is attached to the closing means for discharge purposes and is so adapted to engage a camming block located in a fixed position with respect to the filling platform so that the closing means is only opened when the measuring container arrives at a position over the filling platform. Thus, high speed filling machinery may be constructed which will not crush or bruise the materials being discharged into the cans.

Other objects and advantages of the invention will be made apparent throughout the following description. For a more clear understanding of the invention, the accompanying drawings may be referred to in connection with the detailed description of the invention and its mode of operation. In the drawings:

Figures 1 and 1a are elevation end views respectively of a machine constructed in accordance with the invention with parts thereof broken away for more readily showing the nature of construction of the invention and certain parts of the machine more readily shown in a partial section view;

Figure 1b is a plan view of a portion of the machine of Figure 1;

Figure 2 is an elevation side view of the machinery of Figure 1 with certain of the parts removed;

Figure 2a is an elevation side view of a portion of the machinery adapted for operation in accordance with the invention.

Figure 3:
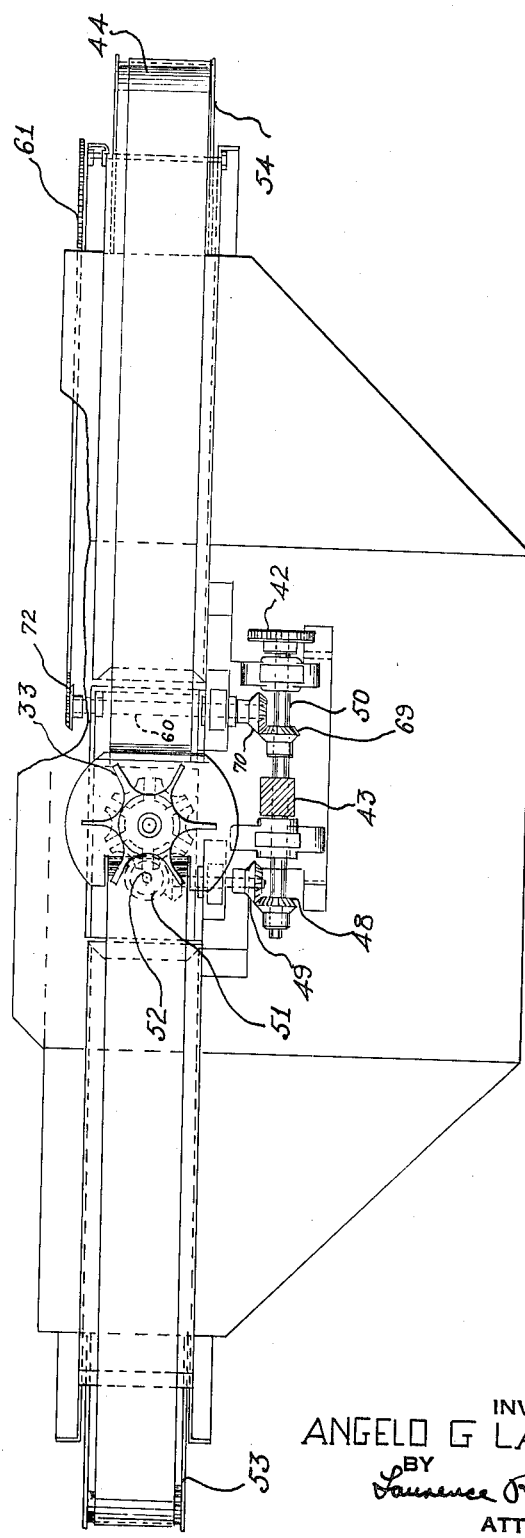
Figure 3 is a top plan view of the machine with certain parts removed.

Throughout the several views, like reference characters designate similar parts in order to facilitate comparison. Those features considered characteristic of the novel features of the invention are defined with particularity in the appended claims.

In Figure 1 the can filling machine is shown with a brine tank 5 mounted by a bearing 6 for rotation along the axis 7 which is directed in this embodiment at an angle of substantially forty-five degrees with respect to a horizontal plane through the filling platform 10. Means (not shown) is provided for partially filling the brine tank with materials to be canned, such as oysters 11. The level of the materials is maintained below the lower edge of the upper measuring container 16 of the rotating tank for reasons which will be hereinafter discussed in detail.

The tank 5 is removably mounted for readily washing and sanitizing by means of fasteners 13 and 14 attached to the frame 15. The bottom of the tank has a plurality of measuring compartments 16 and 17 extending therefrom at regular intervals around the periphery of the tank, which fit into similar projections 16' in the frame 15 as better shown in Figures 1a and 1b. Each of these measuring compartments is chosen of the right size to maintain therein a fixed amount of charge, such as one pint, for filling a can when the measuring container is rotated to the upper tank position directly above the filling platform 10. The measuring containers have open upper ends in communication with the brine tank 5 so that materials from the tank freely enter the measuring containers when they are rotated to the lower level, as shown at position 17, and so that the container will retain only that portion of materials which will find its own level against the inner edge 18 of the measuring container when it nears the uppermost position above the filling platform 10 and spills the excess of materials back into the brine tank 5 because of their own viscosity and the force of gravity. Thus positive filling is afforded as well as accurate measurement.

Different sized cans may be accurately filled with a fixed charge by means of easily interchangeable pipe shaped inserts 19 for the measuring compartments suitably screwed or otherwise fastened to the compartments 16 or 17. Thus, by inserting different sized pipes 19 calculated to discharge proper volumes by changing the wall thickness and keeping the length of the compartments constant, the size of the charge is accurately indexed.

Stopping means comprising the flat closure plates 20 with rubber or similar stopping material faces are provided at the lower ends of the measuring containers 16 and 17 to properly seal them in a closed position. The closure plates 20 are spring biased in a normally closed position by the spring 21 to seal the measuring containers in all positions except the discharge position at the upper edge 12 of the brine tank 5.

The stopping or closing plate 20 is pivoted at a position 22 about the edge of the measuring containers 16 and 17. A camming arm 23 with a rotatable camming member 24 extends from the closing means 20 at the opposite side of the pivot position 22 to provide a first class lever for actuating the closing means. A camming block 25, provided for cooperation with the camming member 24, is fixedly mounted by the bracket member 26 with respect to the filling platform 10. The camming block 25 is so shaped to mate with the camming arm 23 and member 24 as the measuring container to which it is attached arrives over the loading platform 10 upon which a can 30 is awaiting to be filled by the discharge materials 31.

The oysters 31, discharged by gravity, are then directed by the funnel 32 into the awaiting can 30 which is synchronously positioned under the funnel 32 by a Geneva stop or other similar well known mechanism 33 operating in synchronism with the rotation of the brine tank 5. Because the closing means comprises the flat plate 20 seated upon the bottoms of the measuring containers 16 and 17, there are no moving parts in the measuring and discharging assembly which can crush the materials to be canned. The smoothly operating camming mechanism of the closing means, therefore, in combination with the rotatable brine tank 5, affords improved operation for more efficiently canning fragile materials without damage thereto.

The rotating brine tank 5 is supported by rotating frame members 40 or the like near the bottom end. By considering Figures 1 to 3 in greater detail it will be seen that rotation of the brine tank is effected by motor 41 by means of belt drives and a variable speed reducing means 39, which includes fixed speed reducing gears connected to sprocket 42 by a throw chain driving means. Sprocket 42 is affixed to drive shaft 50 on which a worm gear is fixed to drive gear 43 affixed to the shaft supporting and rotating tank 5. To shaft 50 is also affixed the bevel gear 48 which drives bevel gear 49 to rotate the Geneva wheel driver 52. The well-known Geneva stop wheel is affixed thereto as part of the indexing device 33, which brings can 30 into position at the time the measuring container dispensing means opens to discharge materials into the can. Also to shaft 50 a further bevel gear 69 is attached driving in turn bevel gear 70 and shaft 60 to which is attached a further sprocket 72 for driving by means of chain 61 the belt driver drum 54, thus advancing belt 44 always in the proper direction to insert cans on and remove cans from platform 10. Thus synchronous movement of all parts is obtained from a single driving means.

The camming block 25 and the can positioning assembly is illustrated more clearly in Figure 2. Therein it is shown that the camming block 25 is preferably so shaped that the leading edge 45 is inclined to have a more gentle slope than the trailing edge 46. In this manner the materials may be more gently discharged into the funnel 32 and the operational speed of the machine may be increased.

Also to more gently discharge the materials the funnel 32 may be shaped as indicated in Figure 2a to have a gently sloping side 80 so positioned that the drop from the measuring container 16 is small and the materials are therefore not bruised. Because of the force of gravity and the viscosity of the materials, it is evident that the long gentle discharge slope 80 will gently deposit a charge into the can 30.

The can positioning means 33, driven by the motor 41 by medium of the chain driven gear 42 which has the drive shaft 50 attached to the beveled pinion gear 48, causes the pinion drive gear 48 to mesh with the pinion follower gear 49 which is on a shaft extending perpendicularly to the shaft 50 upon which pinion gear 48 is located. At the opposite end of the shaft containing gear 49 is a further pinion drive gear meshing with the pinion following gear 51 to drive the vertical shaft 52. At the opposite end of the shaft 52 is the well-known Geneva movement coupling member 33' which operates the can positioning means 33 to move cans 30 into a loading position during only a small angle of rotation of the shaft 51 and leaving them there until essentially a complete rotation of the shaft is effected. Accordingly, the cans 30 at the instant of loading, when the camming arm rides upon the camming block 25, are stationary under the mouth of the funnel 32.

Drums 53 and 54 are provided together with idler rollers 56 to move the conveying belt 44 to feed cans into the positioning mechanism 33 and carry the filled cans away from the filling mechanism.

This belt drive arrangement is shown in Figure 3 to be driven by means of shaft 60 and chain drive 61 from the same drive shaft 50 to which both the brine tank drive gear 43 and can positioning drive gear 48 is attached. Thus it is readily seen that the Geneva movement and belt conveying mechanisms operate in connection with the rotatable brine tank and camming means to provide high speed filling of cans with fragile materials in an improved manner. Thus there is disclosed in accordance with the invention those constructional features which are representative of the nature of the invention. It is to be recognized that although the embodiment herein described is preferred, certain changes may be made without departing from the scope or spirit of the invention as defined by the following claims.

Having thus described the invention and its mode of operation, the features believed descriptive thereof are claimed as follows:

I claim:

1. A filling machine comprising in combination, a loading platform, an endless belt conveyer for presenting a stream of empty containers at the loading platform, and for removing filled containers from the loading platform, a frame rotatably mounted and having a plurality of apertured projections radially disposed about the axis of rotation, a filling tank removably mounted upon said frame for rotation therewith with its axis at an angle of substantially forty-five degrees with the loading platform to position the tank with upper and lower diametrically opposite portions on the periphery of said tank for rotation to present different positions about the tank periphery at the upper portion above said loading platform, a plurality of smooth open-ended cylindrical measuring compartments extending at regular intervals around the bottom of the filling tank at the outer periphery mating with the projections in said frame and adapted for presentation at said loading platform, a spring biased closing plate pivoted to engage the open ends of each of the measuring compartments, fixed camming means adjacent the loading platform to engage the pivoted plate to release the spring and discharge the compartment contents in response to rotation of said tank, a stationary feed funnel located to feed a measured charge of materials discharged from said compartments, and Geneva movement means coupled with said tank for common drive therewith to operate in synchronism with rotation of said tank to move single empty containers from said conveyor belt in a dwelling position adjacent the feed funnel coincidentally upon presentation of a projection of said frame for conveying said charge to the container and to thereafter move the filled containers to the belt conveyer for removal from the loading platform.

2. A filling machine as defined in claim 1 including smooth flanged pipes fitted into the inner walls of the measuring compartments along their entire length to thereby change the compartment capacity without producing sharp edges tending to damage the charge of materials.

References Cited in the file of this patent

UNITED STATES PATENTS

| | | |
|---|---|---|
| 1,014,447 | Byrd | Jan. 9, 1912 |
| 1,949,170 | McNaney | Feb. 27, 1934 |
| 2,280,826 | Hothersall | Apr. 28, 1942 |
| 2,373,124 | Frank | Apr. 10, 1945 |
| 2,554,939 | Chapman | May 29, 1951 |

FOREIGN PATENTS

| | | |
|---|---|---|
| 528,868 | Germany | Apr. 12, 1930 |